United States Patent

Patent No.: 2752

The United States of America,

TO ALL TO WHOM THESE Letters Patent SHALL COME:

Whereas Samuel Morey a Citizen of [illegible]

the United States hath alleged that he has invented a new and useful improvement in a [illegible] Water Wheel for [illegible] Mills or Machinery [illegible]

[illegible]

*Which improvement he states has not been known or used before his application; hath* [illegible] *that he does verily believe that he is the true inventor or discoverer of the said improvement: hath paid into the treasury of the United States the sum of thirty dollars, delivered a receipt for the same, and presented a petition to the Secretary of State, signifying a desire of obtaining an exclusive property in the said improvement, and praying that a patent may be granted for that purpose:* These are therefore *to grant, according to law, to the said* Samuel Morey *his heirs, administrators or assigns, for the term of fourteen years, from the* [illegible] *day of* [illegible] *one thousand eight hundred and* [illegible] *the full and exclusive right and liberty of making, constructing, using, and vending to others to be used, the said improvement; a description whereof is given in the words of the said* Samuel Morey *himself, in the schedule hereto annexed, and is made a part of these presents.*

In Testimony whereof, *I have caused these Letters to be made Patent, and the Seal of the United States to be hereunto affixed.*

GIVEN *under my hand, at the City of Washington, this* [illegible] *day of* [illegible] *in the year of our Lord One Thousand Eight Hundred and* [illegible] *and of the Independence of the United States of America, the* [illegible]

[illegible]

BY THE PRESIDENT.

[illegible]

[illegible] *Secretary of State.*

*City of Washington, To Wit:*

I DO HEREBY CERTIFY, That the foregoing Letters Patent were delivered to me on the [illegible] day of [illegible] in the year of our Lord, One Thousand Eight Hundred and [illegible] to be examined; that I have examined the same, and find them conformable to law; and I do hereby return the same to the SECRETARY OF STATE, within fifteen days from the date aforesaid, to wit; on this [illegible] day of [illegible] in the year aforesaid.

Richard Rush *Attorney General of the United States.*

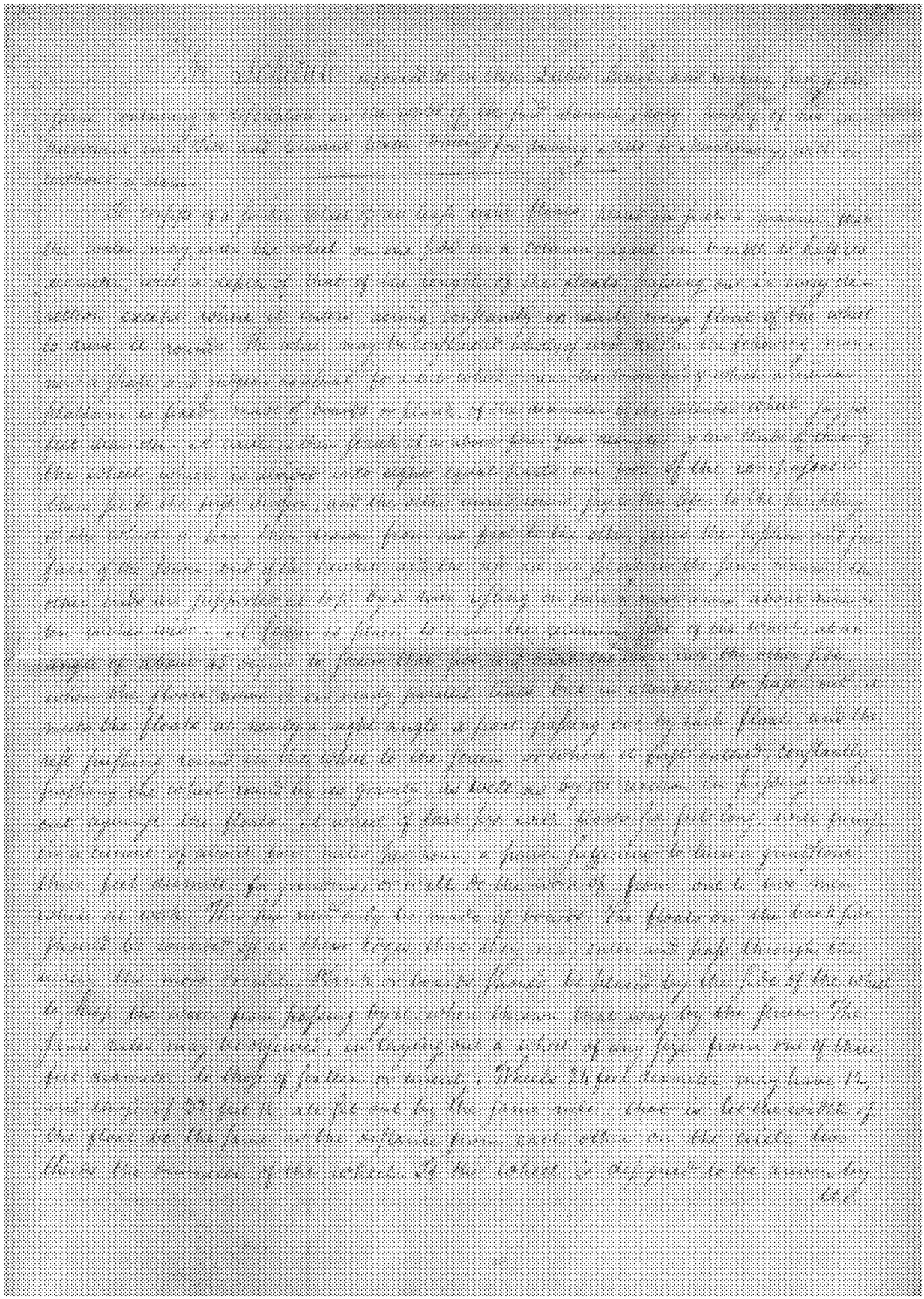

United States Patent Patent No.: 2752

[illegible] [illegible]
[illegible] Wheel the flood and ebb tide [illegible] [illegible] a [illegible] to [illegible] the [illegible] into the wheel at
flood tide [illegible] [illegible] out on the other in the opposite [illegible] [illegible] so as the [illegible]
[illegible] [illegible] the wheel to [illegible] the [illegible] [illegible] a [illegible] time at high
and low water. [illegible] the wheel can be [illegible] [illegible] [illegible], when [illegible] by
the tide or current [illegible] [illegible] [illegible] [illegible] [illegible] the [illegible] [illegible] wheel [illegible]
the more powerful [illegible] [illegible] and the [illegible] [illegible] is [illegible] by [illegible] as
usual. [illegible] [illegible] [illegible] [illegible] [illegible], will [illegible] be, by a [illegible] [illegible] [illegible]
as far as may be [illegible] [illegible] having [illegible] [illegible] one after another, for
placing [illegible] [illegible] [illegible] [illegible] [illegible] [illegible] [illegible] in this case
increase the power [illegible] [illegible] of all the others. In places where there will be danger
from ice or floods [illegible] the wheel will require to be guarded against them
by a rack, or by [illegible] the wheel run wholly under the water at low water
mark. For a [illegible] [illegible] [illegible] a head and fall of eight feet and upwards, a wheel
three feet diameter [illegible] floats about four feet eight inches long will be
sufficient [illegible] [illegible] between the floats and [illegible] of [illegible] or eight
inches for the water to pass. The water [illegible] [illegible] [illegible] or [illegible] into
the wheel as [illegible] as [illegible] [illegible] [illegible] [illegible] [illegible] a three
feet wheel will [illegible] [illegible] [illegible] [illegible] [illegible] [illegible] long. When the
head and fall [illegible] [illegible] [illegible] [illegible] of the [illegible] [illegible]
[illegible] through the wheel should be only about [illegible] inches diameter above
the wheel [illegible] [illegible] [illegible] enough to support the [illegible] as usual. The
advantages of these wheels are, that at a small expense they may be placed
in any [illegible] to drive mills or other machinery, with or without a dam —
[illegible] a much greater surface for the water to act upon — having also the ad-
vantage of running the same way at flood and ebb tides — may also be
applied to a head and fall of water and make a great saving in the quantity
used — are more simple in their construction, are less obstructed by back
water than any other, — have the advantage of running or working as
well in a vertical as horizontal position; — are cheaper and easier made,
and require no seasoned stuff or iron work. I therefore claim the ex-
clusive right of constructing and using them, on the principle that a
column of water may enter on one side the wheel, equal in width to
nearly one half its diameter, on nearly parallel lines with the floats
and [illegible] [illegible] equal to that of their length, and passing out against
them, at nearly a right angle, from every other part as above described.

Witnesses
[illegible] Bolton
J. D. [illegible]

[illegible]